(12) United States Patent
Kopca et al.

(10) Patent No.: US 11,892,335 B2
(45) Date of Patent: Feb. 6, 2024

(54) SYSTEM FOR INDICATING FLUID LEVEL IN FLUID TANKS OF MACHINES

(71) Applicant: Caterpillar Paving Products Inc., Brooklyn Park, MN (US)

(72) Inventors: Andrew Rafael Kopca, Andover, MN (US); Lee Michael Hogan, Mackinaw, IL (US); Jared Todd Woodruff, St. Francis, MN (US); Nathan Mashek, Albertville, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 75 days.

(21) Appl. No.: 17/647,503

(22) Filed: Jan. 10, 2022

(65) Prior Publication Data
US 2023/0221161 A1   Jul. 13, 2023

(51) Int. Cl.
*G01F 23/00* (2022.01)

(52) U.S. Cl.
CPC .................................. *G01F 23/00* (2013.01)

(58) Field of Classification Search
None
See application file for complete search history.

(56) References Cited

U.S. PATENT DOCUMENTS

| 5,705,747 A * | 1/1998 | Bailey .................. G01F 23/168 73/290 R |
|---|---|---|
| 10,101,189 B2 | 10/2018 | Demski |
| 2005/0056092 A1 | 3/2005 | Kowalski |
| 2018/0136027 A1 * | 5/2018 | Demski ................. F21V 23/003 |
| 2020/0400479 A1 | 12/2020 | Kushwaha et al. |

FOREIGN PATENT DOCUMENTS

| CN | 202836681 U | 3/2013 |
|---|---|---|
| DE | 102015015793 A1 * | 6/2017 |
| JP | 2007212382 A | 8/2007 |
| KR | 101209200 B1 | 12/2012 |

* cited by examiner

*Primary Examiner* — Herbert K Roberts (57) ABSTRACT

A system for indicating a fluid level in a fluid tank of a machine includes a plurality of lighting units and at least one indicia. The lighting units are sequentially arranged with respect to each other and configured to be sequentially activated or sequentially deactivated to correspondingly indicate a real-time level of a fluid in the fluid tank. The indicia is disposed along the lighting units to correspondingly indicate at least one threshold level of the fluid in the fluid tank. The indicia allows inference of the real-time level to recede below the at least one threshold level if a sequential deactivation of the lighting units moves past the indicia in a first direction. In addition, the indicia allows inference of the real-time level to exceed the at least one threshold level if a sequential activation of the lighting units moves past the indicia in a second direction.

17 Claims, 4 Drawing Sheets

SYSTEM FOR INDICATING FLUID LEVEL IN FLUID TANKS OF MACHINES

TECHNICAL FIELD

The present disclosure relates to earth moving machines, and more particularly, to a system to indicate if a real-time level or a volume of a fluid in a fluid tank of such machines has receded below (or exceeded above) one or more threshold levels.

BACKGROUND

A machine, such as an earth moving machine, commonly utilizes multiple fluids to accomplish various tasks. As an example, a fluid may correspond to a fuel that may be applied for combustion in a power source (e.g., an internal combustion engine) to generate motive power to propel the machine; a fluid may correspond to a diesel exhaust fluid that may be applied in an aftertreatment process; a fluid may correspond to water that may be supplied to an implement (e.g., if the implement were to include a cutting drum and/or cutting tools) during the implement's working so as to prevent the implement's overheating and/or to suppress environmental dust during the implement's operation. To maintain uninterrupted machine operations and/or to reduce machine downtime, it is a customary practice to replenish a fluid tank with fluid as and when the fluid tank runs short of the fluid. A failure to timely and accurately gauge a depletion of the fluid interrupts the machine's operation, results in the machine's downtime, and, in some cases, also hampers a useful life of one or more components of the machine.

U.S. Pat. No. 10,101,189 discloses a fire apparatus. The fire apparatus includes a liquid level indication system. The liquid level indication system includes a sensor, a controller, and a handrail. The sensor is configured to provide sensor data relating to a level of liquid stored in a tank. The controller is coupled to the sensor and configured to monitor the level of the liquid in the tank based on the sensor data. The handrail includes a housing and a light source. The light source is coupled to the housing and the controller. The controller is configured to selectively illuminate the light source based on a liquid level indication scheme. The liquid level indication scheme relates illumination of the handrail with the level of liquid in the tank. The controller is configured to illustrate the level of liquid in the tank to a user.

SUMMARY OF THE INVENTION

In one aspect, the disclosure relates to a system for indicating a fluid level in a fluid tank of a machine. The system includes a plurality of lighting units and at least one indicia. The lighting units are sequentially arranged with respect to each other and configured to be sequentially activated or sequentially deactivated to correspondingly indicate a real-time level of a fluid in the fluid tank. The indicia is disposed along the lighting units to correspondingly indicate at least one threshold level of the fluid in the fluid tank. The indicia allows inference of the real-time level to recede below the at least one threshold level if a sequential deactivation of the lighting units moves past the indicia in a first direction. In addition, the indicia allows inference of the real-time level to exceed the at least one threshold level if a sequential activation of the lighting units moves past the indicia in a second direction.

In yet another aspect, the disclosure is related to a machine. The machine includes a fluid tank and a system for indicating a fluid level in the fluid tank. The system includes a plurality of lighting units and at least one indicia. The lighting units are sequentially arranged with respect to each other and configured to be sequentially activated or sequentially deactivated to correspondingly indicate a real-time level of a fluid in the fluid tank. The indicia is disposed along the lighting units to correspondingly indicate at least one threshold level of the fluid in the fluid tank. The indicia allows inference of the real-time level to recede below the at least one threshold level if a sequential deactivation of the lighting units moves past the indicia in a first direction. In addition, the indicia allows inference of the real-time level to exceed the at least one threshold level if a sequential activation of the lighting units moves past the indicia in a second direction.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
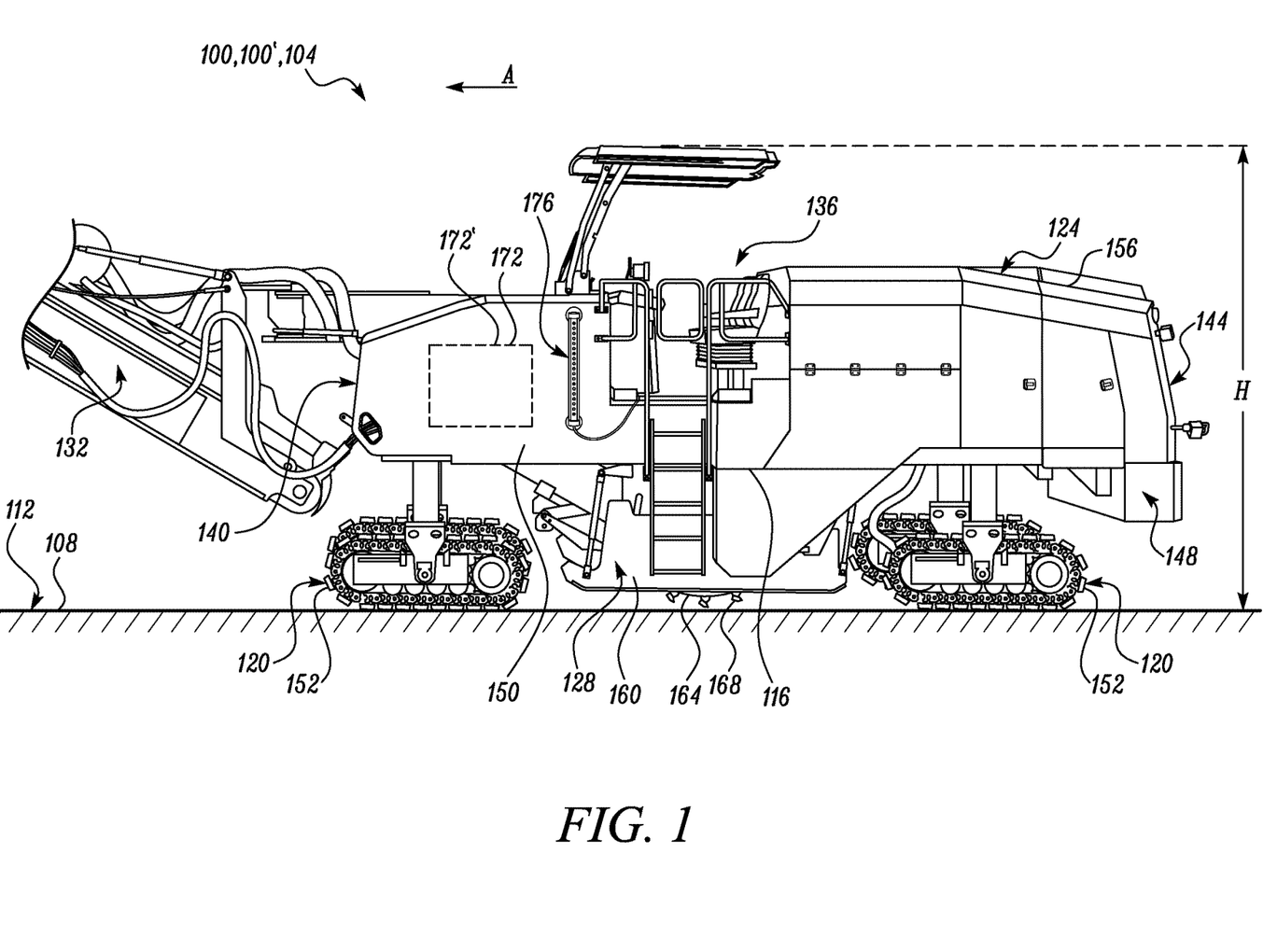
FIG. 1 is a side view of an exemplary machine including a system for indicating a fluid level in a fluid tank, in accordance with an embodiment of the present disclosure.

Referring to FIG. 1, an exemplary machine 100 is shown. The machine 100 may include a roadway/pavement profiler, a roadway planer, or a milling machine 100'. As an example, the milling machine 100' includes a cold planer 104. The machine 100 may be used to perform a milling operation to modify a ground surface 108. For example, the milling operation may mean or include scarifying, removing, mixing, and/or reclaiming material, from the ground surface 108 for the laying of a new surface. Although references to the milling machine 100' are used, aspects of the present disclosure may also be applicable to other machines, e.g., to mobile machines, such as excavators, loaders, graders, off highway trucks, and the like, and references to the milling machine 100' in the present disclosure is to be viewed as purely exemplary. One or more aspects of the present disclosure are also applicable to stationary machines, such as generator sets usable in commercial and domestic establishments, or to a variety of such machines that apply a fluid for one or more of its working.

The machine 100 may define a forward end 140 and a rearward end 144 opposite to the forward end 140. The forward end 140 and the rearward end 144 may be defined in relation to an exemplary direction of travel (indicated by an arrow 'A') of the machine 100, with said direction of travel being defined from the rearward end 144 towards the forward end 140. Also, the machine 100 may include two lateral sides, i.e., a first lateral side 148 (or left side) and a second lateral side (or right side) (not shown) opposite to the first lateral side 148. The two lateral sides may be located transversely relative to the exemplary direction of travel 'A' of the machine 100. Further, the machine 100 may include a frame 116, a set of traction devices 120, a propulsion system 124, a milling assembly 128, a conveyor 132, and an operator cabin 136.

The traction devices 120 may support and propel the frame 116 (or the machine 100) over an expanse of the roadway 112. Exemplarily, the machine 100 may include four traction devices 152 (one at each corner of the frame 116 of the machine 100), although lesser or higher number of traction devices 120 may be contemplated. The propulsion system 124 may include a power compartment 156 and a power source (not shown), such as an internal combustion engine, provided within the power compartment 156. The power source may be configured to power operations of various systems on the machine 100, typically by combusting fuel. The milling assembly 128 may be supported by the frame 116 and may be configured to facilitate the milling operation. The milling assembly 128 may include a mixing chamber 160 and a rotor 164 disposed within the mixing chamber 160. The rotor 164 may include cutting elements 168 arranged around its periphery to engage, grind, and/or pulverize the ground surface 108, as the machine 100 moves over the ground surface 108 (e.g., along the direction, A). Milled materials resulting from the milling operation may be transferred to the conveyor 132, which may in turn convey the milled materials into a dump body of a transport vehicle (e.g., a dump truck) (not shown) that may move ahead of the machine 100.

The operator cabin 136 may be supported over the frame 116. The operator cabin 136 may facilitate stationing of one or more operators therein, to monitor the operations of the machine 100. Also, the operator cabin 136 may house various components and controls of the machine 100, access to one or more of which may help the operators to control the machine's movement and/or operation. For instance, the operator cabin 136 may include an input device 138 (please see FIG. 3) that may be used and/or actuated to generate an input for facilitating control of various systems or devices associated with the machine 100, such as for activating a headlight (not shown) of the machine 100.

With continued reference to FIG. 1, the machine 100 may include one or more outer panels 150 which may be disposed at the first lateral side 148 of the machine 100. The outer panels 150 may be formed of a material, such as aluminized steel, sheet metal, and corrosion resistant steel. The outer panels 150 may be coupled to the frame 116 of the machine 100, e.g., via mechanical fasteners (i.e., bolts, screws, rivets, etc.), welding, brazing, or any other joining process known in the art.

Referring to FIG. 1, the machine 100 includes a fluid tank 172. The fluid tank 172 may be configured to store fluid (e.g., a hydraulic fluid such as water). Such a fluid may be supplied/sprayed (e.g., by way of a pump, not shown) from the fluid tank 172 into the mixing chamber 160 of the milling assembly and generally onto portions of the rotor 164 and the cutting elements 168 so as to dissipate heat of operation from the rotor 164 and the cutting elements 168. Additionally, or optionally, such fluid supply may also be used to suppress and settle a volume of dust arising from the ground surface 108 as the cutting elements 168 may engage the ground surface 108 to perform the milling operation.

It will be appreciated that such a fluid tank of the machine 100, may require to be regularly replenished with the fluid as a low or no fluid level of the fluid may result in an insufficient supply of fluid to the rotor 164 and the cutting elements 168, potentially resulting in improper heat dissipation, reduced suppression of dust, and potential component failure. Therefore, as the fluid tank 172 may be replenished or as fluid may be introduced (through any suitable method) into the fluid tank 172, a fluid level of the fluid may increase within the fluid tank 172. Conversely, as fluid may be urged out or supplied/sprayed (through any suitable method) into the mixing chamber 160 of the milling assembly 128, a fluid level of the fluid may decrease within the fluid tank 172.

To indicate the fluid level in the fluid tank 172, in one or more aspects of the present disclosure, a system 176 is disclosed. The system 176 provides an indication of the fluid level in the fluid tank 172. The indication may be available (e.g., visually) to one or more operators of the machine 100 (e.g., to an operator located within the operator cabin 136 or at a distance from the machine 100, e.g., outside the machine 100) by which a quantity or volume of the fluid within the fluid tank may be inferred. Although the above discussion corresponds to the system 176 that indicates a level of fluid (such as water suppliable to the mixing chamber 160 of the milling assembly 128) in the fluid tank 172, the system 176 may be applicable to a myriad of other fluid tanks located within and out of the machine, such as the ones that may hold fuel, hydraulic fluid, or any other fluid. The system 176 includes multiple lighting units 180 and at least one indicia 184. Also, the system 176 may include a housing 188, a sensor 192, a machine controller 194, and a controller 196.

Figure 2:
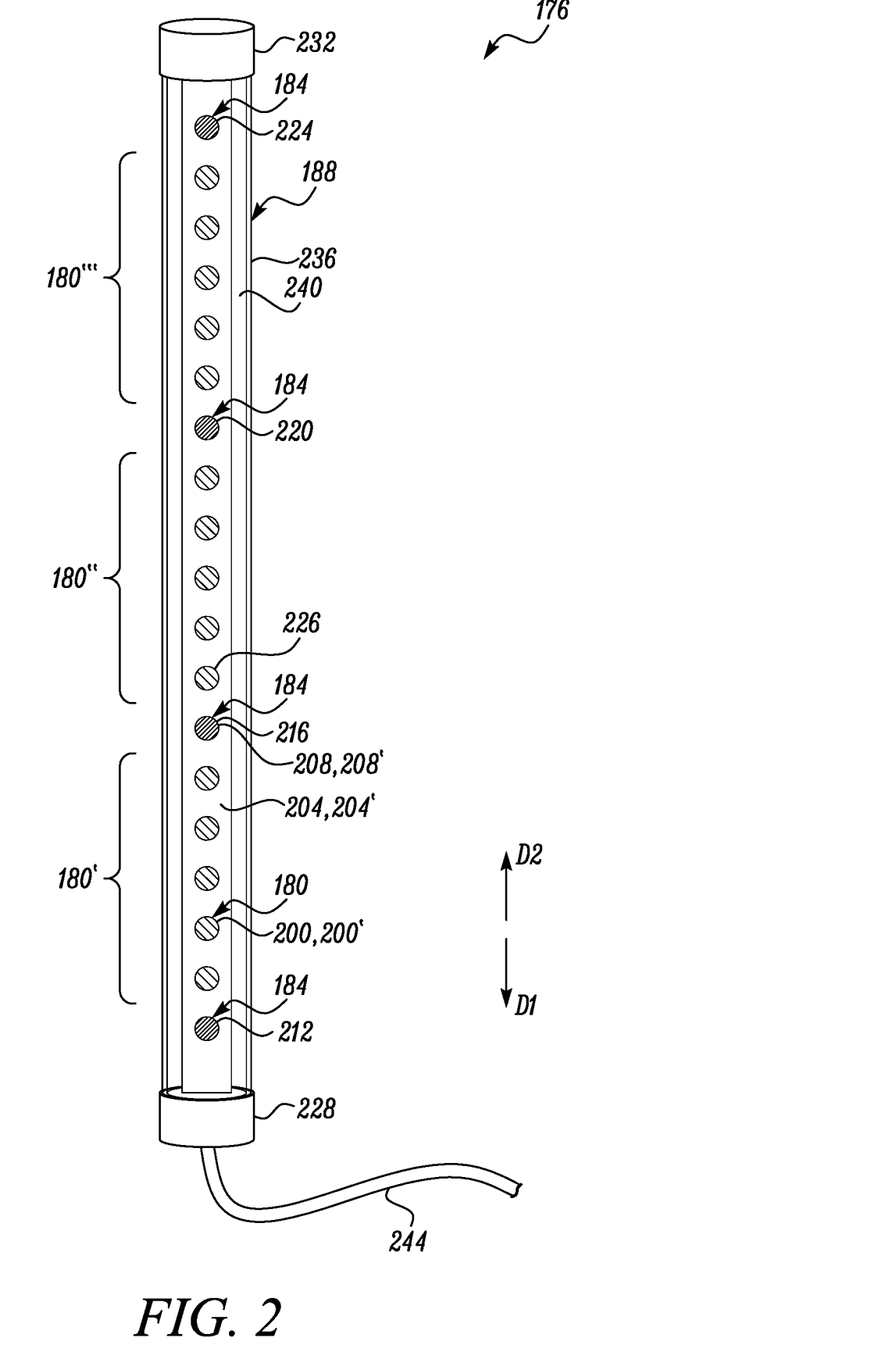
FIG. 2 is a front elevation view of the system, in accordance with an embodiment of the present disclosure.

The lighting units 180 are sequentially arranged with respect to each other. As shown in FIGS. 1 and 2, the lighting units 180 are linearly arranged in an array along a height 'H' (e.g., defined in a direction perpendicular to a length of the machine 100), such that each lighting unit 180 of the lighting units 180 may be arranged at a different elevation from the ground surface 108 to indicate different fluid level in the fluid tank 172. The linear arrangement of the lighting units 180 along the height 'H' of the machine 100 enables the lighting units 180 to be sequentially activated (or deactivated) to correspondingly indicate a real-time level of the fluid in the fluid tank 172. Additionally, the lighting units 180 may be arranged in sets such that each set may include multiple lighting units 180. In the present embodiment, the system 176 includes three sets of the lighting units 180—a first set of lighting units 180', a second set of lighting units 180'', and a third set lighting units 180'''. Each of the first set of lighting units 180', the second set of lighting units 180'', and the third set lighting units 180''', may include five lighting units 180. In other embodiments, it may be contemplated that the system 176 may include more or fewer sets of such lighting units 180.

Further, the lighting units 180 are sequentially arranged on a strip 204. The strip 204 may be a flat strip 204' formed of a non-conductive and flexible material. In an example, the flat strip 204' may include an electrical circuit (not shown) that may facilitate electrical connection between the lighting units 180 and the controller 196. In the present embodiment, fifteen lighting units 180 are sequentially arranged on the strip 204. However, it may be contemplated that more or fewer numbers of lighting units 180 may be disposed on the strip 204.

Each lighting unit 180 of the lighting units 180 may correspond to a first lighting unit 200. The first lighting unit 200 may be configured to emit a first light type having a first attribute. The first attribute may correspond to a first color. In the present embodiment, the first color corresponds to a blue color. In some embodiments, the first color may correspond to any other suitable color, such as a red color, a yellow color, and the like. Further, the first light type emitted by the first lighting unit 200 may have one or more characteristics. In the present embodiment, the one or more characteristics may include brightness.

As shown in the illustrated embodiment of FIG. 2, the first lighting unit 200 includes a light emitting diode (LED) 200'. For example, the light emitting diode 200' may include a base, a chip mounted on the base, a transparent encapsulation sealing the base and the chip, and a driving circuit (not shown). The driving circuit of the light emitting diode 200' may be configured to receive an electrical energy (e.g., from the machine controller 194, or from the controller 196) and supply a regulated electrical energy to the chip. Upon receiving the regulated electrical energy, the chip converts the regulated electrical energy into a visible light.

The indicia 184 may be disposed along the lighting units 180. In the present embodiment, four indicia 184—a first indicia 212, a second indicia 216, a third indicia 220, and a fourth indicia 224 are disposed on the strip 204 along the lighting units 180. As shown in FIG. 2, the first indicia 212 is disposed below the first set of lighting units 180', the second indicia 216 is interposed between the first set of lighting units 180' and the second set of lighting units 180'', the third indicia 220 is interposed between the second set of lighting units 180'' and the third set of lighting units 180''', and the fourth indicia 224 is disposed above the third set of lighting units 180'''.

The indicia 184 is configured to correspondingly indicate at least one threshold level of the fluid in the fluid tank 172 of the machine 100. For instance, the first indicia 212 may correspond to an empty fill level of the fluid in the fluid tank 172, the second indicia 216 may correspond to one-third fill level of the fluid in the fluid tank 172, the third indicia 220 may correspond to two-third fill level of the fluid in the fluid tank, and the fourth indicia 224 may correspond to a full fill level of the fluid in the fluid tank 172. Although the system 176 includes four indicia 184, in some embodiments, it may be contemplated that the system 176 may include more or fewer number of indicia 184 indicating different threshold levels of the fluid in the fluid tank 172.

During operation (e.g., as the fluid is supplied/sprayed into the mixing chamber 160 of the milling assembly 128), the indicia 184 allows inference of the real-time level of the fluid to recede below the at least one threshold level if the sequential deactivation of the lighting units 180 moves past the at least one indicia 184 in a first direction 'D1'. For instance, if the sequential deactivation of the lighting units 180 (e.g., due to a decrease of the fluid level in the fluid tank 172) in the first direction 'D1' moves past the third indicia 220 and stops at a first lighting unit 226 (please see FIG. 2) of the second set of lighting units 180'' above the second indicia 216, it can be inferred that the real-time level of the fluid in the fluid tank 172 is one-third of the full capacity of the fluid tank 172.

Similarly, as the fluid tank 172 may be replenished or as fluid may be introduced into the fluid tank 172, the indicia 184 allows inference of the real-time level of the fluid to exceed the at least one threshold level if the sequential activation of the lighting units 180 moves past the at least one indicia 184 in a second direction 'D2'. For instance, if the sequential activation of the lighting units 180 (e.g., due to increase of the fluid level in the fluid tank 172) in the second direction 'D2' moves past the second indicia 216 and stops at the third indicia 220, it can be inferred that the real-time level of the fluid in the fluid tank 172 is two-third of the full capacity of the fluid tank 172.

Each indicia 184 (i.e., the first indicia 212, the second indicia 216, the third indicia 220, and the fourth indicia 224) may correspond to a second lighting unit 208. The second lighting unit 208 may be configured to emit a second light type having a second attribute. The second attribute corresponds to a second color. The second color is different from the first color to distinguish the threshold level of the fluid from the real-time level of the fluid in the fluid tank 172. In the present embodiment, the second color corresponds to chartreuse green color. In some embodiments, the second color may correspond to any other suitable color, such as a red color, a yellow color, and the like. Further, the second light type emitted by the second lighting unit 208 may have one or more characteristics. In the present embodiment, the one or more characteristics may include brightness.

As shown in the illustrated embodiment of FIG. 2, the second lighting unit 208 includes a light emitting diode 208'. In an example, the light emitting diode 208' may include a base, a chip mounted on the base, a transparent encapsulation sealing the base and the chip, and a driving circuit (not shown). The driving circuit of the light emitting diode 208' may be configured to receive an electrical energy (e.g., from the machine controller 194, or from the controller 196) and supply a regulated electrical energy to the chip. Upon receiving the regulated electrical energy, the chip converts the regulated electrical energy into a visible light.

Although it is shown in the illustrated embodiment of FIG. 2 that the first lighting unit 200 and the second lighting unit 208 include the light emitting diodes, it may be contemplated that the first lighting unit 200 and the second lighting unit 208 may include, but not limited to, at least one of incandescent units (e.g., filament lamps, halogen lamps), fluorescent units, phosphorescent units, high-intensity discharge units (e.g., sodium vapor lamps, mercury vapor lamps, and metal halide lamps), laser units, pyro-luminescent units, and luminescent polymer units. Also, the first lighting unit 200 may have shapes and sizes different from the shapes and sizes of the second lighting unit 208. Additionally, although it is shown in the illustrated embodiment of FIG. 2 that the indicia 184 include the second lighting unit 208, it may be contemplated that the indicia 184 may include, but not limited to, brightly colored flags, ribbons, reflectors, brightly colored filaments, stakes, and colored paint.

The lighting units 180, the indicia 184, and the strip 204 may be coupled to the one or more outer panels 150 of the machine 100. In the illustrated embodiment of FIG. 2, the indicia 184 along with the lighting units 180 and the strip 204 are disposed within the housing 188 which may be coupled to the one or more outer panels 150 of the machine 100. The housing 188 may be coupled to the one or more outer panels 150 at a location such that the lighting units 180 and the indicia 184 may be clearly visible to the one or more operators of the machine 100 (e.g., to the operator located within the operator cabin 136 or at a distance from the machine 100, e.g., outside the machine 100). In some embodiments, the strip 204, on which the indicia 184 and the lighting units 180 are disposed, may be directly coupled to the one or more outer panels 150 of the machine 100. Although the one or more outer panels 150 are located at the first lateral side 148 of the machine 100, it may be contemplated that the one or more outer panels 150 may be located at the second lateral side (not shown), or the forward end 140, or the rearward end 144 of the machine 100. In some embodiments, the lighting units 180, the indicia 184, and the strip 204 may be coupled to a dashboard (not shown) located within the operator cabin 136 of the machine 100.

The housing 188 may define a first end cap 228, a second end cap 232, and an elongated tubular body 236. The first end cap 228, the second end cap 232, and the elongated tubular body 236 collectively define an inner volume 240 to accommodate the strip 204 with the lighting units 180 and the indicia 184. The first end cap 228 and the second end cap 232 may have corresponding pins (not shown) for electrically connecting the lighting units 180 and the indicia 184 to the controller 196 (or the machine controller 194), via an electrical wire 244.

The elongated tubular body 236 may extend between the first end cap 228 and the second end cap 232. The elongated tubular body 236 may fully enclose the lighting units 180, the indicia 184, and the strip 204. In that manner, the elongated tubular body 236 may protect and/or isolate the lighting units 180, the indicia 184, and the strip 204 from the outside environment. The elongated tubular body 236 may include a closed cross-sectional shape, such as a circular cross-sectional shape, a square cross-sectional shape, an oval or elliptical cross-sectional shape, a hexagonal cross-sectional shape, or any irregular cross-sectional shape. In other embodiments, the elongated tubular body 236 may have an open cross-sectional shape, to define one or more of a C-shaped body, or an angular shaped body. Further, the elongated tubular body 236 may be transparent such that the first light type (emitted from the lighting units 180) and the second light type (emitted from the indicia 184) may be visible to the outside environment. In other embodiments, the elongated tubular body 236 may be translucent (e.g., frosty, or milky-white) for transmitting a diffused or dispersed first light type and the second light type.

Figure 3:
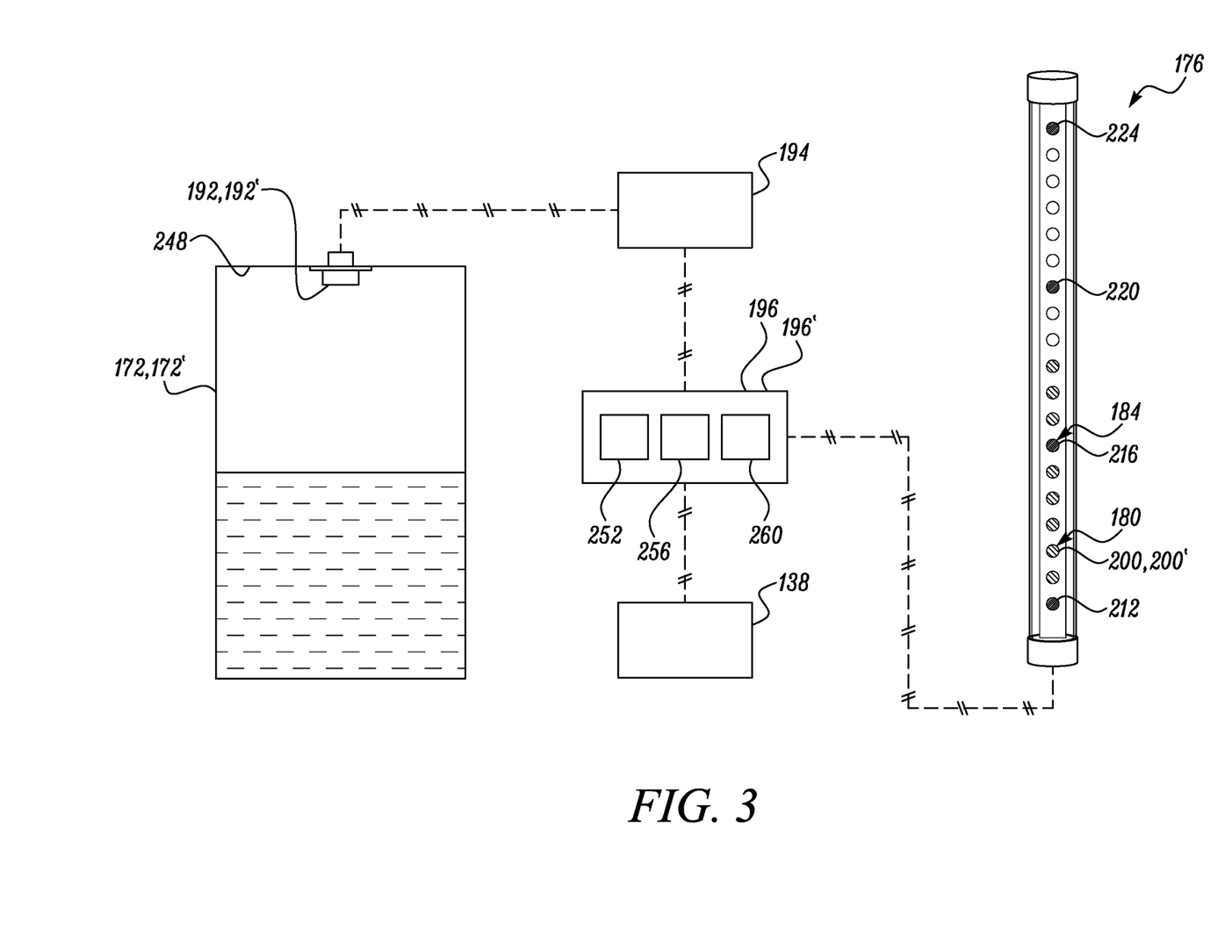
FIG. 3 is a schematic diagram illustrating additional components of the system, with a state of the system exemplarily indicating the fluid level to be at one-half of a full capacity of the fluid tank, in accordance with an embodiment of the present disclosure.

The sensor 192 may be disposed within the fluid tank 172. The sensor 192 may be configured to detect the fluid level of the fluid within the fluid tank 172. Upon detection of the fluid level, the sensor 192 may be configured to generate a signal corresponding to the fluid level of the fluid within the fluid tank 172. The signal may correspond to an analog signal directly proportional to the detected fluid level of the fluid within the fluid tank 172. In an example, the sensor 192 may generate the analog signal in a range of zero to plus five volts, wherein the zero volt may correspond to the empty fill level of the fluid in the fluid tank 172 and the plus five volts may correspond to the full fill level of the fluid in the fluid tank 172. Further, the sensor 192 may be configured to electronically communicate the signal to the machine controller 194.

In the present embodiment, the sensor 192 may include an ultrasonic sensor 192' mounted on an upper inner wall 248 of the fluid tank 172 (as shown in FIG. 3). To detect the fluid level of the fluid within the fluid tank 172, the ultrasonic sensor 192' may transmit an ultrasonic signal towards the fluid within the fluid tank 172 and receive an echo of the transmitted ultrasonic signal. Subsequently, the ultrasonic sensor 192' may detect a time elapsed since the transmission of the ultrasonic signal by the ultrasonic sensor 192' and the receipt of the echo of the transmitted ultrasonic signal at the ultrasonic sensor 192'. In response to the time elapsed, the ultrasonic sensor 192' may detect the fluid level of the fluid within the fluid tank 172.

Although, in the present embodiment, the ultrasonic sensor 192' is used to detect the fluid level of the fluid within the fluid tank 172, it may be contemplated that the sensor 192 may include any other suitable level sensor such as a float type level sensor, a pressure type level sensor, a conductive type level sensor, a capacitance type level sensor, an optical type level sensor, a microwave type level sensor, a magneto strictive type level sensor, and a magneto resistive type level sensor, applications and employment of which may be contemplatable by someone of skill in the art.

The machine controller 194 may be communicably coupled to the sensor 192. The machine controller 194 may be configured to receive the signal (e.g., 0-5V analog signal) corresponding to the fluid level in the fluid tank 172, from the sensor 192. Further, the machine controller 194 may be configured to convert the signal (i.e., the analog signal) to a corresponding pulse width modulated (PWM) signal. Additionally, the machine controller 194 may be configured to electronically communicate the pulse width modulated signal to the controller 196.

The machine controller 194 may include one or more processors, a memory, and/or other components (not shown) for controlling one or more systems and/or subsystems of the machine 100. The machine controller 194, in some examples, may include an electronic control module (ECM), a powertrain control module (PCM), a transmission control module (TCM), a brake control module (EBCM), a central control module (CCM), a central timing module (CTM), a general electronic module (GEM), a body control module (BCM), a suspension control module (SCM), a control unit, and/or any other types of ECUs.

The controller 196 may be communicably coupled to the machine controller 194 and the lighting units 180. The controller 196 may also be communicably coupled to the indicia 184. The controller 196 may be configured to receive the pulse width modulated signal corresponding to the fluid level in the fluid tank 172, from the machine controller 194. In response to the receipt of the pulse width modulated signal, the controller 196 may be configured to determine a corresponding number of lighting units 180 of the plurality of lighting units 180 to be activated or de-activated. For instance, upon receipt of a pulse width modulated signal corresponding to a fluid level equal to one-half of the full capacity of the fluid tank 172, the controller 196 may utilize a look-up table (pre-stored in a memory 252 of the controller 196) to determine that eight lighting units 180 (out of the fifteen lighting units 180) are required to be activated. Subsequently, the controller 196 may be configured to sequentially activate (or deactivate) the corresponding number of lighting units 180 to correspondingly indicate the real-time level of the fluid in the fluid tank 172. For example, the controller 196 may transmit corresponding output signals (i.e., activation signals) to the driving circuits of the first eight lighting units 180 from the bottom of the system 176.

Additionally, or optionally, the controller 196 may be communicably coupled to the input device 138. For instance, the controller 196 may be configured to receive an input, associated with the adjustment of the one or more characteristics (e.g., brightness) of the lighting units 180 and the indicia 184, from the input device 138. In another instance, the controller 196 may be configured to receive the input, for an activation of an electrical load (not shown) of the machine 100, from the input device 138. In response to the receipt of the input, the controller 196 may be configured to adjust the one or more characteristics (e.g., brightness) of the first light type and the second light type associated with the lighting units 180 and the indicia 184, respectively.

In an example, upon actuation of the input device 138 to activate a headlight (not shown) of the machine 100, the controller 196 may transmit corresponding output signals (i.e., pulse-width modulation signals of low frequency) to the lighting units 180 and the indicia 184 to decrease the brightness of the lighting units 180 and the indicia 184, respectively. In another example, upon actuation of the input device 138 to deactivate the headlight of the machine 100, the controller 196 may transmit corresponding output signals (i.e., pulse-width modulation signals of high frequency) to the lighting units 180 and the indicia 184 to increase the brightness of the lighting units 180 and the indicia 184, respectively.

The controller 196 may include a processor 256 to process a variety of data (or input) such as the input received from the input device 138, pulse width modulated signals received from the machine controller 194, and the like. Examples of the processor 256 may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Further, the controller 196 may include a transceiver 260. According to various embodiments of the present disclosure, the transceiver 260 may enable the controller 196 to communicate (e.g., wirelessly) with the machine controller 194, the input device 138, the lighting units 180, the indicia 184, etc., over one or more of wireless radio links, infrared communication links, short wavelength Ultra-high frequency radio waves, short-range high frequency waves, or the like. Example transceivers may include, but not limited to, wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

Examples of the memory 252 may include a hard disk drive (HDD), and a secure digital (SD) card. Further, the memory 252 may include non-volatile/volatile memory units such as a random-access memory (RAM)/a read only memory (ROM), which may include associated input and output buses. The memory 252 may be configured to store various other instruction sets for various other functions of the machine 100, along with the set of instruction, discussed above.

In the present embodiment, the controller 196 may be a standalone controller 196'. The controller 196 may be housed within the housing 188 of the system 176. Further, one or more functionalities and/or operations of the machine controller 194 and the controller 196 may be interchanged— e.g., one or more functionalities of the machine controller 194 may be performed by the controller 196, and vice versa. Moreover, certain discussions applicable to the machine controller 194 may be suitably applicable to the controller 196, as may be contemplated by someone skilled in the art based on the present disclosure. In some embodiments, the machine controller 194 may be integrated with the controller 196 and/or may be one and the same as the controller 196. In some embodiments, the machine controller 194 and/or the controller 196 may include multiple controllers that may independently control one or more of the aforesaid functions performable by the machine controller 194 and/or by the controller 196.

INDUSTRIAL APPLICABILITY

Before starting of the operation of the machine 100, the real-time fluid level of the fluid (e.g., water) stored in the fluid tank 172 may correspond to a first level (e.g., one-half of the full capacity of the water tank, see FIG. 3). Accordingly, the sensor 192 may detect the first level of the fluid in the fluid tank 172 and generate a corresponding signal (e.g., a first analog signal). Subsequently, the signal may be electronically communicated to the machine controller 194. Upon receipt of the signal, the machine controller 194 may convert the signal to a corresponding first pulse width modulated signal and communicate the first pulse width modulated signal to the controller 196.

Upon receipt of the first pulse width modulated signal, the controller 196 may utilize the look-up table (pre-stored in the memory 252 of the controller 196) to determine that eight lighting units 180 (out of the fifteen lighting units 180) are required to be activated to indicate the first level of the fluid in the fluid tank 172. Upon determination of the eight lighting units 180 (out of the fifteen lighting units 180) to be activated, the controller 196 may activate the first eight lighting units 180 from the bottom of the system 176. Upon activation, the first eight lighting units 180 from the bottom may illuminate (i.e., emit blue color light) to indicate the first level of the fluid within the fluid tank 172.

Over time, during the operation of the machine 100, the fluid (e.g., water) stored in the fluid tank 172 is supplied into the mixing chamber 160 of the machine 100 so as to prevent the overheating of the rotor 164 and the cutting elements 168, and/or to suppress environmental dust. In an example, as the fluid is supplied into the mixing chamber 160 over time, the real-time level of fluid within the fluid tank 172 may change from the first level to a second level below the first level. Accordingly, the sensor 192 may detect the second level of the fluid in the fluid tank 172 and communicate a corresponding signal (e.g., a second analog signal different from the first analog signal) to the machine controller 194. Upon receipt of the signal, the machine controller 194 may convert the signal to a corresponding second pulse width modulated signal, which may be communicated to the controller 196.

Upon receipt of the second pulse width modulated signal, the controller 196 may utilize the look-up table to determine that seven lighting units 180 (out of the fifteen lighting units 180) are required to be activated to indicate the second level of the fluid in the fluid tank 172. Upon determination of the seven lighting units 180 to be activated, the controller 196 may deactivate the topmost lighting unit 180 out of previously activated eight lighting units 180 from the bottom. The remaining seven lighting units 180 from the bottom may continue to illuminate (i.e., emit blue color light) to indicate the second level of the fluid within the fluid tank 172. In this manner, as the level of the fluid within the fluid tank 172 may continue to recede to further lower levels, the controller 196 may one-by-one deactivate the corresponding topmost activated lighting unit 180 (out of previously activated lighting units 180) to indicate the corresponding real-time level of the fluid within the fluid tank 172.

Figure 4:
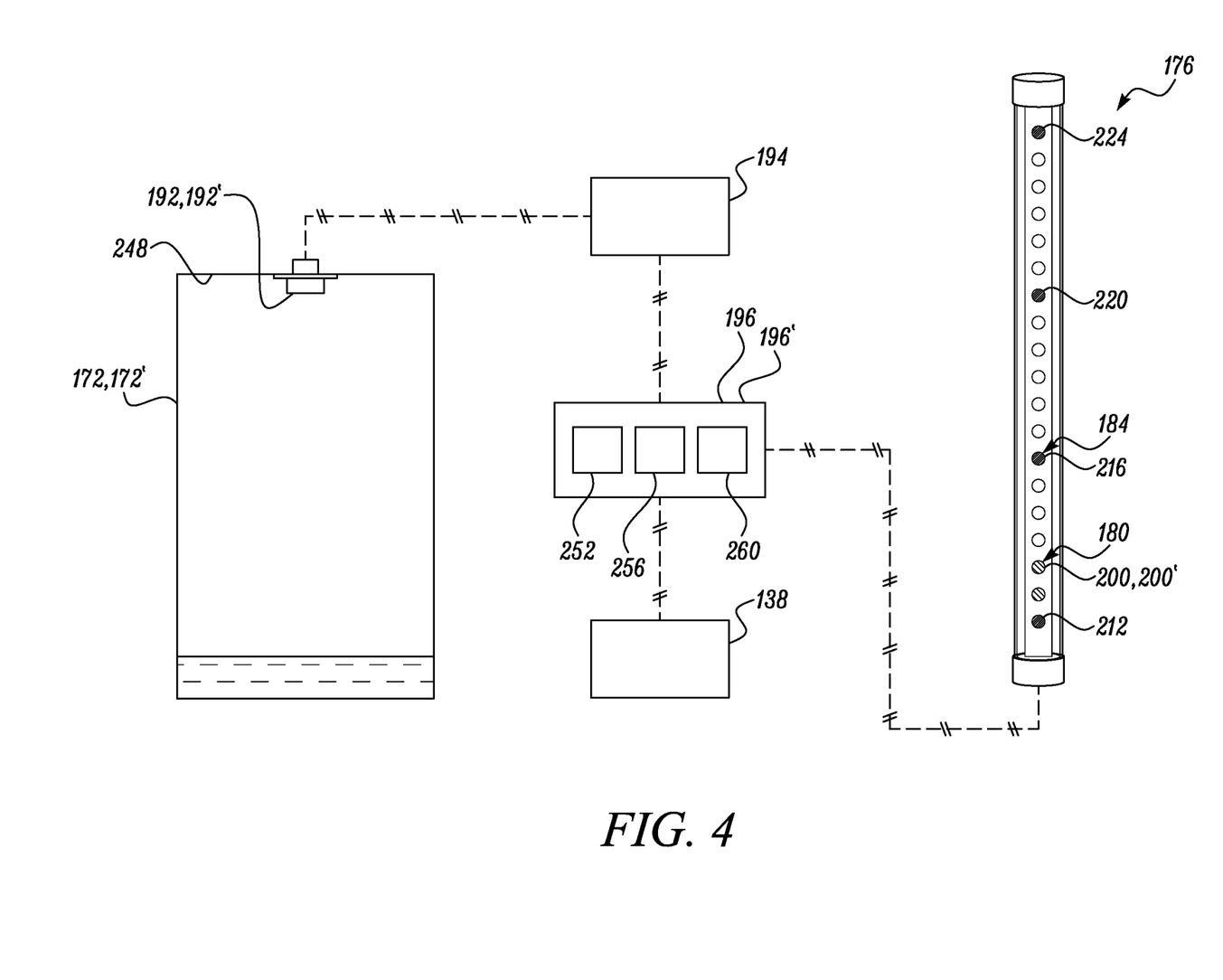
FIG. 4 is a schematic diagram similar to the schematic diagram of FIG. 3, with the system exemplarily indicating the fluid level to be at one-tenth of the full capacity of the fluid tank, in accordance with an embodiment of the present disclosure.

As soon as the sequential deactivation of the lighting units 180 moves past the indicia 184 in the first direction 'D1', it may be inferred that the real-time level of the fluid within the fluid tank 172 has receded below the threshold level indicate by the indicia 184. For example, when the sequential deactivation of the lighting units 180 in the first direction 'D1' moves past the second indicia 216, it may be inferred that the real-time level of the fluid has receded below the one-third level of the fluid within the fluid tank 172. One such level of the fluid within the fluid tank 172 (e.g., one-tenth of the full capacity of the fluid tank 172) is shown in FIG. 4. At this time, the operator of the machine 100 may raise a request to refill the fluid tank 172.

Further, as the fluid tank 172 may be replenished or as fluid may be introduced into the fluid tank 172, the real-time level of fluid within the fluid tank 172 may change from the first level to a third level above the first level. Accordingly, the sensor 192 may detect the third level of the fluid in the fluid tank 172 and communicate a corresponding signal (e.g., a third analog signal different from the first analog signal) to the machine controller 194. Upon receipt of the signal, the machine controller 194 may convert the signal to a corresponding third pulse width modulated signal, which may be communicated to the controller 196.

Upon receipt of the third pulse width modulated signal, the controller 196 may utilize the look-up table to determine that nine lighting units 180 (out of the fifteen lighting units 180) are required to be activated to indicate the third level of the fluid in the fluid tank 172. Upon determination of the nine lighting units 180 to be activated, the controller 196 may activate the lighting unit 180 located next above the first eight lighting units 180 (i.e., already activated eight lighting units 180 from the bottom). The nine lighting units 180 may illuminate (i.e., emit blue color light) to indicate the third level of the fluid within the fluid tank 172. In this manner, as the level of the fluid within the fluid tank 172 may continue to increase to further higher levels, the controller 196 may sequentially activate the corresponding lighting units 180 located next above the topmost lighting unit 180 of the already activated lighting units 180 to indicate the corresponding real-time level of the fluid within the fluid tank 172.

As soon as the sequential activation of the lighting units 180 moves past the indicia 184 in the second direction 'D2', it may be inferred that the real-time level of the fluid within the fluid tank 172 has exceeded above the threshold level indicate by the indicia 184. For example, when the sequential activation of the lighting units 180 in the second direction 'D2' moves past the second indicia 216, it may be inferred that the real-time level of the fluid has exceeded above the one-third level of the fluid within the fluid tank 172.

Additionally, when the operation is performed in low ambient light conditions (e.g., night), the operator of the machine 100 may desire to dim the lighting units 180 and the indicia 184. In this regard, the operator may manipulate/actuate the input device 138 to generate an input requesting the dimming of the lighting units 180 and the indicia 184. The controller 196 may receive the input requesting the dimming of the lighting units 180 and the indicia 184, from the input device 138, and transmit corresponding pulse-width modulation signals (of low frequency) to the lighting units 180 and the indicia 184 to decrease the brightness of the lighting units 180 and the indicia 184, respectively.

Conversely, when the operation is performed in high ambient light conditions (e.g., afternoon), the operator of the machine 100 may desire to brighten the lighting units 180 and the indicia 184. In this regard, the operator may manipulate/actuate the input device 138 to generate an input requesting the brightening of the lighting units 180 and the indicia 184. The controller 196 may receive the input requesting the brightening of the lighting units 180 and the indicia 184, from the input device 138, and transmit corresponding pulse-width modulation signals (of high frequency) to the lighting units 180 and the indicia 184 to increase the brightness of the lighting units 180 and the indicia 184, respectively.

The disclosed system 176 provides an accurate, clear, and easy to recognize (or read) information regarding the levels of various fluids present within various fluid tanks (such as the fluid tank 172). For instance, the lighting units 180 of the disclosed system 176 indicates the real-time level of the fluid within the fluid tank 172 to the operator of the machine 100 and the indicia 184 of the disclosed system 176 indicates the corresponding threshold level and where the fluid level is with respect to threshold level. In that manner, the disclosed system 176 may facilitate the operator of the machine 100 and/or one or more site supervisors to timely and accurately gauge the level of fluid within the fluid tank 172, take timely action to replenish the fluid tank with fluid when the fluid level recedes below the threshold level, and hence, reduce (or avoid) costly machine downtime and/or loss of productive man-hours.

It will be apparent to those skilled in the art that various modifications and variations can be made to the system and/or method of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A system for indicating a fluid level in a fluid tank of a machine, the system comprising:
    a plurality of lighting units sequentially arranged with respect to each other and configured to be sequentially activated or sequentially deactivated to correspondingly indicate a real-time level of a fluid in the fluid tank;
    at least one indicia disposed along the plurality of lighting units to correspondingly indicate at least one threshold level of the fluid in the fluid tank; and
    a headlight of the machine that is separate from the plurality of lighting units and from the at least one indicia, wherein:
        the at least one indicia allows inference of the real-time level to recede below the at least one threshold level if a sequential deactivation of the plurality of lighting units moves past the at least one indicia in a first direction,
        the at least one indicia allows inference of the real-time level to exceed the at least one threshold level if a sequential activation of the plurality of lighting units moves past the at least one indicia in a second direction,
        the at least one indicia is interposed between, and is adjacent to, first and second lighting units of the plurality of lighting units,
        the at least one indicia is configured to emit light having a first attribute,
        the first and second lighting units are configured to emit light having a shared second attribute different from the first attribute,
        activation of the headlight causes a decrease in a brightness of light emitted by the plurality of lighting units, and
        deactivation of the headlight causes an increase in the brightness of light emitted by the plurality of lighting units.

2. The system of claim 1, wherein
the first lighting unit is disposed adjacent to an additional lighting unit of a plurality of first lighting units configured to emit light having the second attribute,
the second lighting unit is disposed adjacent to an additional lighting unit of a plurality of second lighting units configured to emit light having the second attribute, and
the at least one indicia is interposed between the plurality of first lighting units and the plurality of second lighting units.

3. The system of claim 1, wherein the first attribute comprises a first color, and the second attribute comprises a second color, the first color being different from the second color.

4. The system of claim 3, wherein the first color corresponds to a blue color and the second color corresponds to a chartreuse green color.

5. The system of claim 1 further comprising:
a sensor configured to detect the fluid level of the fluid in the fluid tank and generate a signal corresponding to the fluid level; and
a controller configured to:
determine a corresponding number of lighting units of the plurality of lighting units to be activated or de-activated based on the signal; and
sequentially activate or sequentially deactivate the corresponding number of lighting units to correspondingly indicate the real-time level of the fluid in the fluid tank.

6. The system of claim 5, wherein
the controller comprises a first controller associated with the plurality of lighting units, and the first controller is configured to:
receive an input from a second controller of the machine separate from the first controller, the second controller being configured to receive the signal from the sensor and to generate the input based on the signal; and
adjust, in response to the input, the second attribute of the light emitted by the first and second lighting units.

7. The system of claim 6, wherein the second attribute comprises at least one of brightness and color of the light emitted by the first and second lighting units.

8. The system of claim 1, wherein the at least one indicia corresponds to one or more of an empty fill level of the fluid in the fluid tank, one-third fill level of the fluid in the fluid tank, two-third fill level of the fluid in the fluid tank, and a full fill level of the fluid in the fluid tank.

9. A machine, comprising:
a fluid tank; and
a system for indicating a fluid level in the fluid tank, the system including:
a plurality of lighting units sequentially arranged with respect to each other and configured to be sequentially activated or sequentially deactivated to correspondingly indicate a real-time level of a fluid in the fluid tank;
at least one indicia disposed along the plurality of lighting units to correspondingly indicate at least one threshold level of the fluid in the fluid tank; and
a headlight of the machine that is separate from the plurality of lighting units and from the at least one indicia, wherein:
the at least one indicia allows inference of the real-time level to recede below the at least one threshold level if a sequential deactivation of the plurality of lighting units moves past the at least one indicia in a first direction,
the at least one indicia allows inference of the real-time level to exceed the at least one threshold level if a sequential activation of the plurality of lighting units moves past the at least one indicia in a second direction,
the at least one indicia is interposed between, and is adjacent to, first and second lighting units of the plurality of lighting units,
the at least one indicia is configured to emit light having a first attribute,
the first and second lighting units are configured to emit light having a shared second attribute different from the first attribute,
activation of the headlight causes a decrease in a brightness of light emitted by the plurality of lighting units, and
deactivation of the headlight causes an increase in the brightness of light emitted by the plurality of lighting units.

10. The machine of claim 9, wherein
first lighting unit is disposed adjacent to an additional lighting unit of a plurality of first lighting units configured to emit light having the second attribute,
the second lighting unit is disposed adjacent to an additional lighting unit of a plurality of second lighting units configured to emit light having the second attribute, and
the at least one indicia is interposed between the plurality of first lighting units and the plurality of second lighting units.

11. The machine of claim 9, wherein the first attribute comprises a first color, and the second attribute comprises a second color, the first color being different from the second color.

12. The machine of claim 11, wherein the first color corresponds to a blue color and the second color corresponds to a chartreuse green color.

13. The machine of claim 9, the system further comprising a housing defining an inner volume to accommodate the plurality of lighting units and the at least one indicia.

14. The machine of claim 9, the system further comprising:
a sensor configured to detect the fluid level of the fluid in the fluid tank and generate a signal corresponding to the fluid level; and
a controller configured to:
determine a corresponding number of lighting units of the plurality of lighting units to be activated or de-activated based on the signal; and
sequentially activate or sequentially deactivate the corresponding number of lighting units to correspondingly indicate the real-time level of the fluid in the fluid tank.

15. The machine of claim 14, wherein the controller comprises a first controller associated with the plurality of lighting elements, and the first controller is configured to:
receive an input from a second controller disposed on the machine and separate from the first controller, the second controller being configured to receive the signal from the sensor and to generate the input based on the signal; and adjust, in response to the input, one or more characteristics of the light emitted by
the first lighting unit,
the second lighting unit, and
the at least one indicia.

16. The machine of claim 15, wherein the one or more characteristics include brightness.

17. The machine of claim 9, wherein the machine includes one or more outer panels, and wherein the plurality of lighting units and the at least one indicia are coupled to the one or more outer panels.

\* \* \* \* \*